United States Patent
Bourdillon

(10) Patent No.: US 6,552,917 B1
(45) Date of Patent: Apr. 22, 2003

(54) SYSTEM AND METHOD FOR REGULATING MULTIPLE OUTPUTS IN A DC-DC CONVERTER

(75) Inventor: Laurence Bourdillon, New Milford, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/992,925

(22) Filed: Nov. 5, 2001

(51) Int. Cl.[7] ............................................... H02M 3/335
(52) U.S. Cl. .................................................... 363/21.12
(58) Field of Search ................................ 363/20, 21.01, 363/21.04, 21.1, 21.11, 21.12, 21.18

(56) References Cited

U.S. PATENT DOCUMENTS

| | | | |
|---|---|---|---|
| 4,833,582 A | * | 5/1989 | Kupka .......................... 363/21 |
| 4,847,742 A | * | 7/1989 | Ohashi et al. ................. 363/21 |
| 4,958,268 A | | 9/1990 | Nagagata et al. |
| 5,146,394 A | | 9/1992 | Ishii et al. |
| 5,400,239 A | | 3/1995 | Caine |
| 5,442,540 A | | 8/1995 | Hua et al. |
| 5,490,052 A | | 2/1996 | Yoshida et al. |
| 5,570,278 A | | 10/1996 | Cross |
| 5,617,015 A | | 4/1997 | Goder et al. |
| 5,644,479 A | | 7/1997 | Yoshida et al. |
| 5,663,874 A | | 9/1997 | Mader et al. |
| 5,684,679 A | * | 11/1997 | Hong .......................... 363/21 |
| 5,790,389 A | | 8/1998 | Hua |
| 6,075,295 A | | 6/2000 | Li |

FOREIGN PATENT DOCUMENTS

DE      0772284 A2 *  5/1997

* cited by examiner

Primary Examiner—Matthew Nguyen
(74) Attorney, Agent, or Firm—Edward W. Goodman

(57) ABSTRACT

A multiple output flyback converter provides independently controlled high-bandwidth secondary side voltage regulation for rapid response to small signal changes at the multiple outputs on the secondary side. Each of the multiple output circuits includes a fast local feedback loop to perform rapid and precise secondary side voltage regulation. The fast local secondary side feedback loops compensate for small changes in the load on the order of 1 to 5 percent. By providing each output circuit with independent secondary-side control, the last or final voltage output is controlled from the primary side. A further feature of the inventive circuit is that the input circuit of the converter includes an active clamp circuit for recovering both energy in the leakage inductance and additionally recovers residual energy in the magnetic field of the secondary winding of the transformer at the end of each energy cycle.

14 Claims, 4 Drawing Sheets

SYSTEM AND METHOD FOR REGULATING MULTIPLE OUTPUTS IN A DC-DC CONVERTER

BACKGROUND OF THE INVENTION

1. Technical Field of the Invention

The present invention relates generally to the field of multiple output dc—dc converters. More particularly, the present invention relates to the regulation of multiple outputs in flyback converters.

2. Description of the Related Art

Conventional switching power supplies commonly include a power transformer and one or more power switches for alternately coupling an unregulated DC or rectified AC voltage across a primary winding of the power transformer in a series of voltage pulses. These pulses are converted into a series of voltage pulses across one or more secondary windings of the power transformer and then rectified and filtered to provide one or more output DC voltages. The output voltage or voltages of the power converter are commonly regulated by controlling the relative amount of time that the power switch is on (i.e., the duty cycle).

One common type of switching power supply is the flyback power converter, which is an isolated version of the buck-boost converter. A flyback power converter works by cyclically storing energy in a coupled inductor, and then dumping this stored energy into a load. By varying the amount of energy stored and dumped per cycle, the output power can be controlled and regulated. A switching transistor connected in series with the primary winding of the power transformer normally provides such a switching function. That is, the on-time and off-time of this power switch controls the amount of energy stored in the coupled magnetic field. When the power switch is on, current flows through the primary winding of the power transformer, and energy is stored in the transformer. When the power switch is off, the stored energy is transferred out into a secondary circuit by means of current flowing out of one or more secondary windings of the power transformer. Note that the secondary current does not flow in the power transformer at the same time that the power switch is on and the primary current is flowing. The reason for this is that in a conventional flyback power converter, the primary-secondary winding polarity is chosen such that a rectifier when coupled to the secondary winding will prevent conduction of current in the secondary winding when the power switch is on.

Flyback power converters are advantageous at lower power levels over other switching power converters due to the fact that they are generally simpler, they require a reduced number of components, and they allow multiple regulated outputs to be available from a single supply. Common applications for flyback converters are AC adapters, which may, for example, deliver an output voltage in the range of between 9 VDC to 180 VDC at power levels of 20 to 100 Watts, drawing power from a rectified AC mains, which may vary between 85 VAC to 410 VAC for universal mains input.

Flyback converters are generally operated in one of two modes, a first mode, referred to as discontinuous conduction mode, well known in the art, in which the energy stored in the transformer is totally coupled to the output load before the next energy cycle, generally resulting in the secondary current reaching zero before the next drive cycle. The second mode of operation is referred to as continuous conduction mode, whereby the next energy cycle begins before all stored magnetic energy is released from the transformer, and therefore before the secondary current reaches zero. Discontinuous conduction mode is more common than continuous conduction mode because relatively simple control circuitry can be used to maintain output voltage regulation by varying the frequency and/or on-time of the power switch to accommodate heavy or light load conditions.

The control circuitry for either DCM or CCM operation is somewhat similar. In the case of CCM, the loop bandwidth must generally be much lower to avoid instability due to the right hand plane zero (RHPZ) from the output diode. Because of its higher bandwidth capabilities, DCM is often preferred. For high current applications, CCM is generally preferable because the root-mean-square (RMS) currents (hence losses) are lower.

FIG. 1 illustrates a conventional active clamp flyback converter having multiple secondary outputs and an active snubber network on the primary side to protect the main switch $S_M$. In a conventional flyback converter, all of the outputs are 'on' simultaneously. The ratio of the output voltages on the different windings is determined by the winding ratio and the actual relative voltage levels are determined by the 'on' time of the main switch.

FIG. 2 is an illustration of another conventional flyback converter having sequenced multiple secondary outputs sourced from a single secondary winding. The circuit of FIG. 2 further includes a passive resistor-capacitor-diode (RCD) snubber network formed by capacitor $C_s$, resistor $R_s$, and Diode DS on the primary side to protect the main switch $S_M$. Such networks are well known in the art.

The circuit of FIG. 2 operates in accordance with a simple sequential pulse-width modulation (PWM) scheme for controlling the 'on' time of the respective outputs. PWM schemes are well known in the art. A drawback associated with the circuit configuration of FIG. 2 concerns certain limitations imposed on the output voltage control.

In particular, if the converter operates in a continuous mode (DCM), then all of the energy stored in the transformer T during the primary switch $S_m$ 'on' time must be transferred to the secondary outputs 211, 213, 215 during each switching cycle.

In the circuit, each of the outputs on the secondary side is locally controlled with the exception of the last or final output. The final output (e.g., output 215) is indirectly controlled by the 'on' time of the primary side switch $S_M$. That is the 'on' time of the primary switch $S_M$ must be of such duration to guarantee that there is sufficient energy stored in the transformer during the charging cycle to maintain a voltage $V_3$ across $R_3$ at a pre-determined level, irrespective of the 'on' time of switch $S_M$. It is noted that irrespective of how long a time switch $S_M$ is maintained in the 'on' state, if there is insufficient energy stored in the transformer in the first instance, once the discharge cycle is initiated maintaining switch $S_M$ 'on' for a longer duration cannot correct for an initially insufficient amount of energy stored in the transformer to maintain the third output at the proper voltage level. For precise secondary side control, this is not a desirable limitation. Additionally, this restriction imposes a further drawback requiring that there be a "smart" controller on the primary side.

It is therefore an object of the present invention to provide an improved power converter having each of a plurality of outputs regulated exclusively from the secondary side quasi-independent of the 'on' time of the primary switch.

SUMMARY OF THE INVENTION

In accordance with the present invention, a multiple output flyback converter is provided. The converter provides independently controlled high gain-bandwidth secondary side voltage regulation to compensate for rapid small signal changes at the multiple outputs on the secondary side. In a preferred embodiment, the converter further includes a low gain-bandwidth slow loop feedback controller connecting the secondary and primary sides for responding more slowly to large signal changes.

The converter according to the present invention includes a transformer, or coupled inductors, having a primary winding and a secondary winding. The secondary winding includes first and second terminals. An input circuit is connected to the primary winding for coupling an input DC voltage to the primary winding. The input circuit includes an active clamp circuit for recovering both energy in the leakage inductance, as is performed in prior art circuits, and in addition, recover residual energy in the magnetic field of the secondary winding of the transformer at the end of each energy cycle.

In accordance with one embodiment, multiple identically constructed output circuits are connected in parallel to the first and second terminals of the secondary winding. Each output circuit includes a switch connected in series with a diode, an energy storage capacitor connects the diode/switch pair to the return lead. Each output circuit further includes a fast feedback loop (i.e., secondary side controllers) which maintains a regulated output voltage. The fast feedback loop compensates for small changes in the load on the order of 1 to 5 percent.

The multiple output flyback converter of the present invention, in addition to providing secondary side controllers for maintaining a regulated output voltage, also requires a primary controller for controlling the primary switch 'on' time to supply the output requirements.

An advantage of the circuit of the present invention is that with secondary-side control, the accuracy and bandwidth of the primary loop can be relaxed. The primary controller is responsible for maintaining the required amount of energy 'overdrive' to allow small-signal control of the last secondary winding output. This can be accomplished in a number of different ways. One way is to monitor the current level in the last secondary winding at the time of turn-off via an opto-coupler. Alternatively, the primary controller could monitor secondary turn-off by the voltage change on the drain of the primary switch.

Another advantage of the circuit of the present invention is that small load changes are rapidly and precisely compensated for exclusively on the secondary side via fast local feedback loops for each output. This feature overcomes the limitation of the prior art in which the last or final output is controlled from the primary side.

A further advantage of the circuit of the present invention is that the local feedback loops on the secondary side provide more precise voltage control than can be achieved with prior art configurations.

A still further advantage of the circuit of the present invention is that excess or residual energy stored in the secondary winding of the coupled winding is returned to the source via the primary circuit via the active clamp network. A still further advantage of the circuit of the present invention is that soft-switching of primary side switches is achieved via the active clamp.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
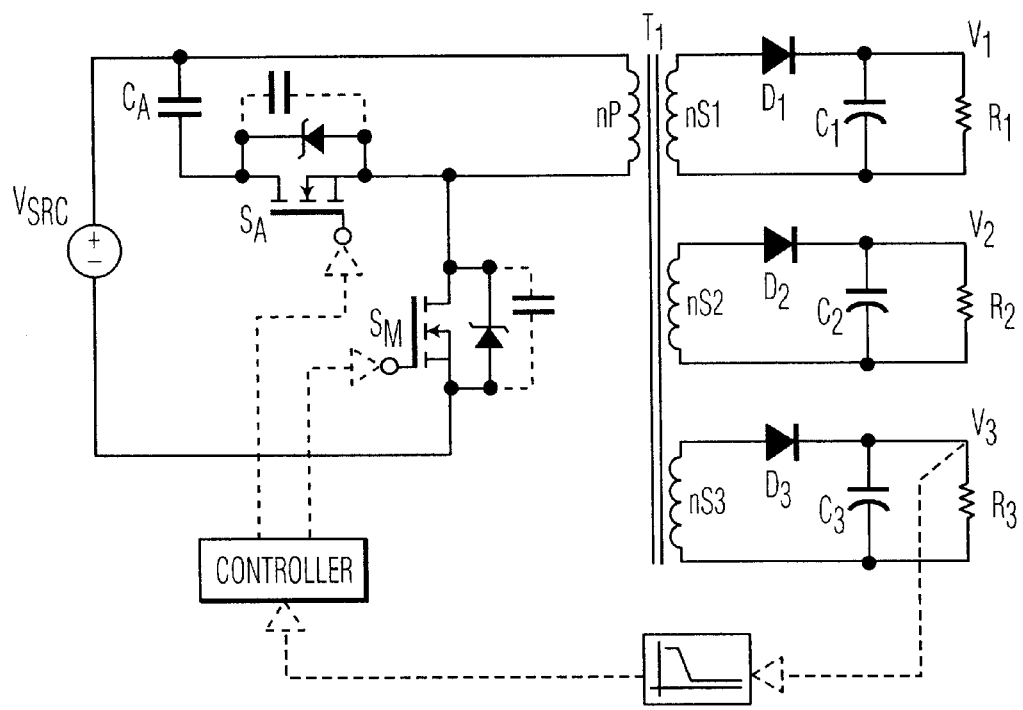
FIG. 1 is a circuit diagram illustrating a conventional active clamp flyback converter having multiple secondary outputs and an active snubber network.
Figure 2:
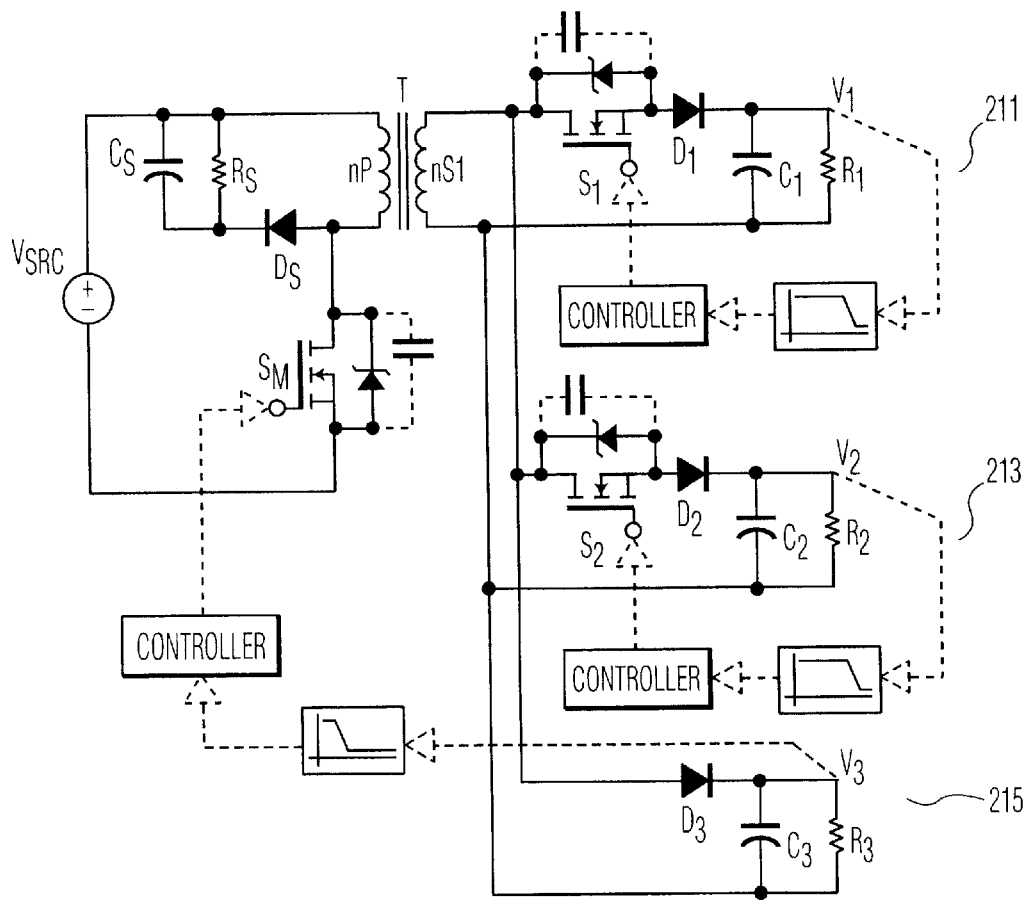
FIG. 2 is a circuit diagram illustrating a conventional active clamp flyback converter having sequenced multiple secondary outputs sourced from a single secondary winding.
Figure 3:
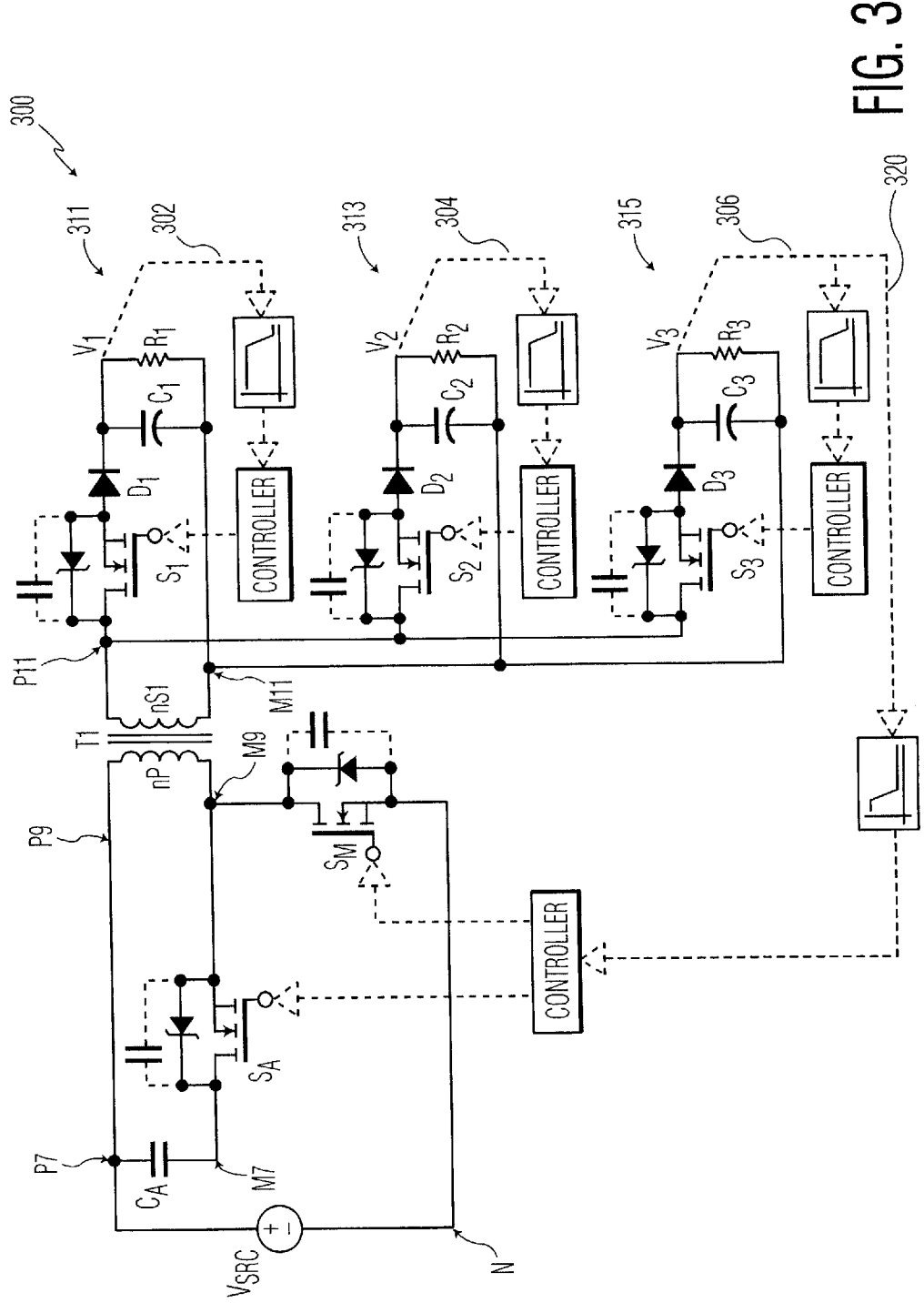
FIG. 3 is a circuit diagram illustrating an active clamp flyback converter in accordance with an embodiment of the present invention.

FIG. 3 shows in schematic detail a preferred embodiment of the invention including a multiple output converter of flyback type 300, in which isolation transformer T1 primary winding nP connects from positive node P9 to node M9. While secondary winding nS1 provides converter input to a plurality of similarly constructed output circuits 311, 313 and 315. Each output circuit includes conventional flyback converter components, including, for example, with reference to output circuit 311, switch S1 coupled to the anode of rectifying diode D1 and output filter capacitor C1 is connected in parallel with diode D1 and load resistor R1.

A positive terminal of the main power source $V_{SRC}$ is coupled in parallel to a first terminal of capacitor $C_A$ P7 and a first terminal of isolation transformer T1 P9. A second terminal of the main power source is coupled to the ground M. Switch SA is coupled at Intermediate node M9 to one terminal of power switch $S_M$. Capacitor $C_A$ is coupled at a second terminal to switch $S_A$ at node M7. Capacitor $C_A$ and switch $S_A$ collectively form an active clamp circuit.

Further, it will be apparent to one of ordinary skill in the art that the device of the present invention could have additional loads and switches coupled to nodes P11 and M11. The schematic of FIG. 3 shows only three loads, i.e., loads R1, R2 and R3, in an exemplary embodiment of the invention and in no way limits the number of loads the device of the present invention can accommodate. It will be apparent to those skilled in the art that the device of the present invention can provide output voltages to multiple loads and modification by adding additional loads may be made to the embodiment chosen for illustration without departing from the spirit and scope of the invention.

Referring now to the output circuits 311, 313 and 315. The output voltages V1, V2 and V3 supplied to the loads R1, R2 and R3, respectively, are formed by integrating a proportional amount of inductor current in the capacitors $C_1$, $C_2$ and $C_3$, respectively. Energy from the main power source, $V_{SRC}$ is stored in the transformer T1 during the transformer charging phase. Supplying a charge to the output capacitors $C_1$, $C_2$ and $C_3$ at the loads occurs in the discharge phase.

The configuration of the switches $S_1$, $S_2$ and $S_3$ in the present invention determines whether the circuit is charging or discharging. During the transformer charging phase during which the main power source, $V_{SRC}$ charges isolation transformer T1, all of the switches are in the open state, except for the switch $S_M$. Once the transformer T1 is sufficiently charged, the switch $S_M$ is opened. In actual operation, the first switch in the switching sequence, e.g., switch S1, is usually turned on somewhat ahead of the primary switch $S_M$ being turned off (opened). In general, there may often be some overlap between the ON and OFF times of the sequential controlled switches. This occurs for two reasons, first, the flyback converter should not be left "unloaded" (i.e., all outputs OFF), and second, soft-switching can be achieved with some overlap.

During the discharge cycle, only one switch is in a closed state at any given time so that the load coupled to the closed switch will receive the maximum charge from the inductor. Feedback loops 302, 304 and 306 (i.e., fast loop controllers) are responsible for coordinating and implementing the time duration for the open and closed states for the switches S1, S2 and S3 to insure that a predetermined voltage level is maintained at each output.

Figure 4A:
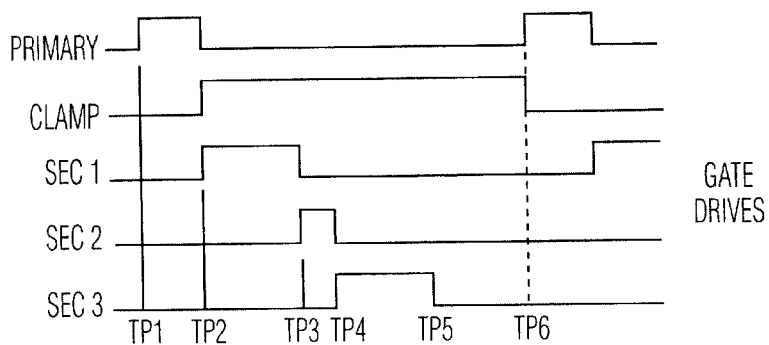
FIG. 4a illustrates the open and closed states of switches of the circuit of FIG. 3 during one inductor charge/discharge cycle.

FIG. 4a illustrates the open and closed states of the switches $S_M$, $S_1$, $S_2$ and $S_3$ for the circuit of FIG. 3 during one inductor charge/discharge cycle. A full cycle is illustrated between the time period TP1 to time period TP6 where the transformer T1 has gone through one full charging and discharging cycle.

Charging Phase

While primary switch $S_M$ is closed, the isolation transformer T1 is in a charging phase. This charging phase is denoted by the time period TP1 to TP2 during which time the primary winding nP charges in accordance with the portion of the energy curve labeled "primary charging phase" in FIG. 4c. Likewise, while primary switch $S_M$ is open, the isolation transformer T1 is in a discharging phase as denoted by the time period TP2 to TP6 and further in accordance with the portions of the energy curve labeled {Sec1, Sec2, Sec3}. During the time period TP2 to TP6, only one load is being charged at a time, and the loads $R_1$, $R_2$ and $R_3$ can receive different amounts of charging time based on instantaneous load as measured by the respective feedback loops 312, 314 and 316.

That is, each of the output circuits 311, 313 and 315 requires a charging time sufficient to ensure that the final output is being properly maintained. To do so, feedback loops 302, 304 and 306 detect the instantaneous voltage level and adjust the ON/OFF times of respective switches $S_1$, $S_2$ and $S_3$ to maintain a predetermined voltage level. As an example, the feedback loop 302 associated with output circuit 311 feeds back some measure of the voltage $V_1$ across load $R_1$ to control switch $S_1$ so as to maintain the output voltage $V_1$ at a predetermined level. The time required to properly maintain the voltage at a predetermined level is shown as the time period TP2 to TP3. Similarly, the feedback loop 304 associated with output circuit 313 feeds back some measure of the voltage $V_2$ across load $R_2$ to control switch $S_2$ and so on for the third or more output circuits.

Discharge Phase

Time period TP2 defines the start of the discharge phase. At this time, switch $S_M$ changes to an open state and switch $S_1$ changes to a closed state. For the time period TP2 to TP3, the switch $S_1$ remains closed and the load $R_1$ is charged as illustrated by the portion of the energy curve labeled Sec 1 of FIG. 4b. The slope of the current decay is a function of the inductance and the voltage across $R_1$.

Figure 4B:
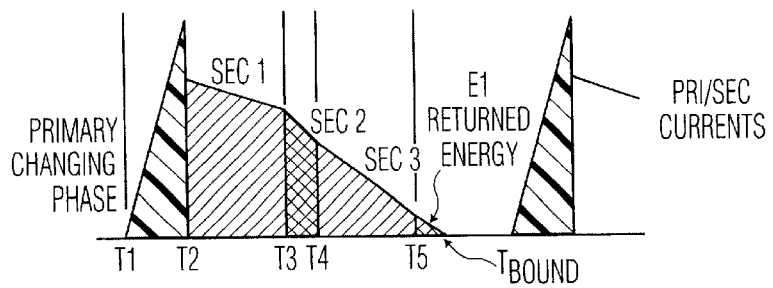
FIGS. 4b–4d illustrate exemplary energy storage curves during one inductor charge/discharge cycle for the circuit of FIG. 3.

For the time period TP3 to TP4, the switch $S_2$ is in a closed state, and the switch $S_1$ is in an open state which results in the load $R_2$ being charged as illustrated in the portion of the energy curve labeled Sec 2 in FIG. 4b.

For the time periods TP4 to TP5, the switch $S_3$ is in a closed state, and switches $S_1$ and $S_2$ are in an open state which results in the load $R_3$ being charged as illustrated in the portion of the energy curve labeled Sec 3 of FIG. 4b.

With reference to FIG. 3, there is also shown a slow loop feedback controller 320 connecting the secondary and primary circuits. It is contemplated that the slow loop controller may serve one of two functions: (1) to perform low-bandwidth coarse control that attempts to compensate for large signal changes at the output. This process would occur over a much longer duration (i.e., hundreds of cycles) as compared with the fast loop controllers which compensate within a few cycles. The slow-loop controller generally operates as a standard feedback loop by sensing the output voltage and controlling the ON times of the primary side switches accordingly, (2) Use as a synchronizing signal to synchronize the primary and secondary circuits. This may be required because in certain energy cycles, the final output circuit stabilizes sooner than in other cycles. The primary circuit must have some way of knowing that the final secondary circuit has stabilized or that the last secondary circuit in the sequence has turned off.

In a preferred mode of operation, the circuit is operated to compensate for load variations on the order of 1 to 5 percent. If additional compensation is required, then such compensation may be provided via the slow loop controller, illustrated in FIG. 3 as element 320. As shown, the slow loop controller 320 bridges the secondary and primary circuits to control primary side switches $S_A$ and $S_M$ to thereby supply the output requirements. While the slow loop controller 320 will compensate for larger signal changes, as contrasted with the fast loops (e.g., 302, 304, 306) which can compensate for smaller instantaneous load changes.

An important aspect of the present invention is that precise and rapid small signal, secondary side control is performed for each output circuit (e.g., 311, 313, 315) via the associated fast-loop feedback circuits (e.g., 302, 304, 306). The rapid secondary side control rapidly compensates for instantaneous load changes.

Figure 4C:
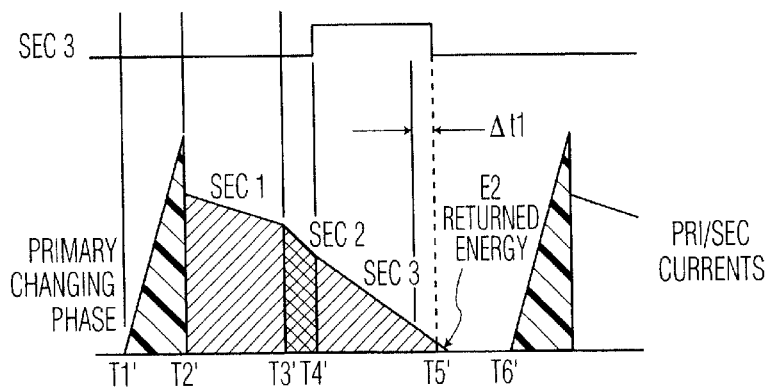
Figure 4D:
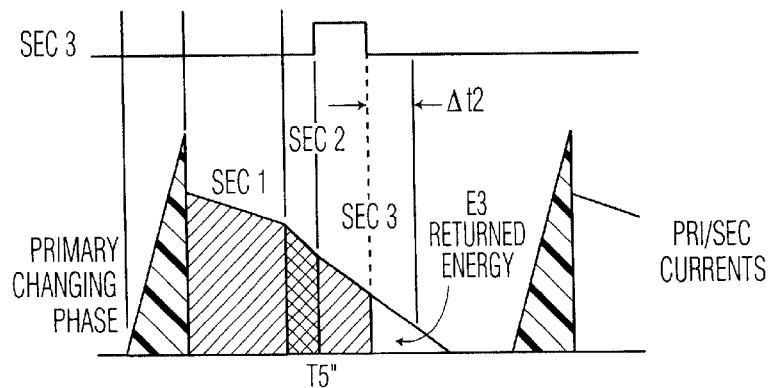

In performing precise and rapid secondary side control, the operation of the circuit of FIG. 3 results in a small amount of residual energy at the end of each energy cycle, as shown in FIGS. 4b–4d (see returned energy areas E1, E2, E3). The residual energy is returned back to the source in each cycle via the active clamp circuit in the primary.

The method of performing secondary side control in accordance with the method of the invention will now be described with reference to FIGS. 4b through 4d.

Referring initially to FIG. 4b, the area labeled "residual energy E1" represents energy which remains in the secondary winding nS1 of the transformer T1 at the end of one representative energy cycle. In each energy cycle, the energy stored in the secondary winding nS1 during the primary charging phase is used to stabilize the voltages at each of the respective output circuits (e.g., 311, 313, 315).

In each cycle, subsequent to each of the respective output voltages being stabilized, there will typically remain some unused (residual) energy after the final (e.g., third) output has been stabilized. The average amount of residual energy at the end of a cycle can be adjusted via the 'on' time of primary switch $S_M$. That is, by maintaining the 'on' time of primary switch $S_M$ 'on' for a longer time, a larger amount of residual energy will result. A certain amount of residual energy is desired to provide compensation for rapidly responding to instantaneous load changes on the secondary side. The manner in which the residual energy is used to compensate for the instantaneous load changes is now described.

FIGS. 4b through 4d illustrate three cases which require different amounts of residual energy to compensate for load fluctuations.

FIG. 4b represents a baseline case wherein at time TP5, the third or final output voltage level $V_3$ stabilizes leaving an amount of residual energy whose area is defined as E1.

FIG. 4c represents a case wherein the third or final output voltage level $V_3$ stabilizes at a later time TP5 than the baseline case (i.e., TP5'>TP5). This delta in stabilization time is indicated as delta-t1 in FIG. 4c which results in the use of additional residual energy, E2 >E1. It is noted, however, that if the stabilization time exceeds the time $T_{bound}$, then there will be an insufficient amount of residual energy available to provide compensation. That is, $T_{bound}$ represents an upper limit in terms of compensation whereby all available residual energy is consumed at this time.

FIG. 4d represents a case where the third or final output voltage level $V_3$ stabilizes at an earlier time TP5" (TP5"<TP5) than described in the baseline case. This case represents the situation where the instantaneous change in the load requires less energy than that required in the baseline case (i.e., E1<E3). This delta in stabilization time from the baseline is indicated by delta-t2 in FIG. 4d.

As shown in the illustrative examples, the falling edge of the Sec 3 'on' time in FIG. 4a can oscillate to the left (e.g., FIG. 4d) or right (e.g., FIG. 4c) to compensate for small instantaneous variations in the load. Such small signal changes are compensated for by the fast loop 306 as long as the load change requiring additional energy does not require more energy than is made available in the "residual energy" region by design, as indicated by $T_{bound}$ in the illustrative example.

It is noted that the circuit may be alternately designed such that no "residual energy" is provided for in each cycle. In this case, the falling of the Sec 3 'on' time would nominally occur at the point defined as $T_{bound}$ in FIG. 4b. Compensation would then be unipolar in the sense that compensation can only be provided for load changes requiring less than the nominal amount of residual energy, as illustrated in FIG. 4d.

An important aspect of the present invention is that an active clamp circuit is used in the primary to recover the residual energy. Conventionally, an active clamp has been used in prior art circuits to recover non-coupled leakage inductor energy and provide soft-switching of the primary switches. The inventive circuit uses the active clamp for this purpose and to recover the residual energy. In recovering the residual energy, there will be some loss due to dissipation in the clamp switch, $S_A$. The path by which the residual energy is recovered and transferred back to the source in each cycle is through the primary winding nP, switch $S_A$ and back to the source, $V_{SRC}$.

Although the invention has been described with a certain degree of particularity, various modifications may be made to the embodiments disclosed herein. It is, therefore, to be understood that the above description should not be construed as limiting, but merely as an exemplification of the various embodiments.

What is claimed is:

1. A DC-DC converter for providing independent secondary side voltage regulation for a plurality of loads comprising:

a power transformer having at least a primary winding and a secondary winding;

an input circuit coupled to said primary winding for coupling an input DC voltage to said primary winding;

a plurality of output channels coupled to said secondary winding, each of said output channels having a secondary side switching element;

secondary side control means for alternately turning on and off said secondary side switching elements for providing said independent secondary side voltage regulation; and a feedback of a residual energy level from a last of the plurality of output channels to a control associated with the input circuit coupled to said primary winding, the feedback used by the control to adjust a charging of the primary winding to provide a threshold residual energy level.

2. The DC-DC converter circuit of claim 1 wherein said input circuit includes a primary side switching element, a storage capacitor and a switching element.

3. The DC-DC converter circuit of claim 1, where said each of said output channels further includes a rectifier diode and a smoothing filter capacitor.

4. The DC-DC converter of claim 1, wherein said input circuit comprises an active clamp circuit.

5. The DC-DC converter of claim 4, wherein said active clamp circuit is adapted to recover energy in each switching cycle of said secondary side switching elements.

6. The DC-DC converter of claim 5, wherein the energy comprises leakage energy and excess energy stored in said secondary winding during each switching cycle.

7. The DC-DC converter of claim 1, wherein said secondary side control means comprises a plurality of feedback loops each associated with a respective one of said plurality of output channels, said plurality of feedback loops being adapted to maintain a secondary side voltage indicative of a respective secondary side switching element independently of a primary side switching element voltage.

8. The DC-DC converter of claim 7, wherein each of said plurality of feedback loops comprise a pulse width modulation (PWM) control unit coupled, to an output node and coupled to respective said secondary side switching elements for generating the PWM signal in response to the output voltage.

9. The DC-DC converter of claim 1, wherein the DC-DC converter is of flyback type.

10. The DC-DC converter of claim 1, wherein the DC-DC converter is of forward type.

11. The DC-DC converter of claim 1, wherein the primary side switching element is A MOSFET transistor with an integral reverse diode.

12. The DC-DC converter of claim 1, wherein the primary side switching element is a bipolar junction transistor with an integral reverse diode.

13. The DC-DC converter of claim 1, wherein during a charging cycle said input DC voltage charges said power transformer with an amount of energy sufficient to provide an independent regulated DC power level to respective said plurality of loads and to additionally provide a residual amount of energy to compensate for fluctuations in said plurality of loads.

14. A method for providing independent secondary side voltage regulation for a plurality of loads, said method comprising the steps of:

providing a DC-DC converter for providing independent secondary side voltage regulation for a plurality of loads;

providing a power transformer having at least a primary winding and a secondary winding;

providing an input circuit coupled to said primary winding for coupling an input DC voltage to said primary winding;

providing a plurality of output channels coupled to said secondary winding, each of said output channels having a secondary side switching element;

providing secondary side control means for alternately turning on and off said secondary side switching elements for providing said independent secondary side voltage regulation; and providing a feedback of a residual energy level from a last of the plurality of output channels to a control associated with the input circuit coupled to said primary winding, the feedback used by the control to adjust a charging of the primary winding to provide a threshold residual energy level.

* * * * *